(12) United States Patent
Lewis et al.

(10) Patent No.: US 9,367,814 B1
(45) Date of Patent: Jun. 14, 2016

(54) METHODS AND SYSTEMS FOR CLASSIFYING DATA USING A HIERARCHICAL TAXONOMY

(75) Inventors: Glenn M. Lewis, Costa Mesa, CA (US); Kirill Buryak, Sunnyvale, CA (US); Aner Ben-Artzi, Los Angeles, CA (US); Jun Peng, San Ramon, CA (US); Nadav Benbarak, Boston, MA (US)

(73) Assignee: Google Inc., Mountain View, CA (US)

( * ) Notice: Subject to any disclaimer, the term of this patent is extended or adjusted under 35 U.S.C. 154(b) by 357 days.

(21) Appl. No.: 13/530,505

(22) Filed: Jun. 22, 2012

Related U.S. Application Data

(60) Provisional application No. 61/580,503, filed on Dec. 27, 2011.

(51) Int. Cl.
*G06N 99/00* (2010.01)
(52) U.S. Cl.
CPC .................................. *G06N 99/005* (2013.01)
(58) Field of Classification Search
None
See application file for complete search history.

(56) References Cited

U.S. PATENT DOCUMENTS

| | | |
|---|---|---|
| 6,751,614 B1 | 6/2004 | Rao |
| 7,158,986 B1 | 1/2007 | Oliver et al. |
| 7,496,567 B1 | 2/2009 | Steichen |
| 7,584,100 B2 | 9/2009 | Zhang et al. |
| 7,593,904 B1 | 9/2009 | Kirshenbaum et al. |
| 7,937,345 B2 | 5/2011 | Schmidtler et al. |
| 7,958,067 B2 | 6/2011 | Schmidtler et al. |
| 8,090,717 B1 | 1/2012 | Bharat et al. |
| 8,583,416 B2 * | 11/2013 | Huang ................ G10L 15/1822 704/251 |
| 2003/0130993 A1 | 7/2003 | Mendelevitch et al. |
| 2006/0095521 A1 | 5/2006 | Patinkin |
| 2006/0155575 A1 | 7/2006 | Gross |
| 2007/0027830 A1 | 2/2007 | Simons et al. |
| 2010/0017487 A1 | 1/2010 | Patinkin |
| 2010/0122212 A1 | 5/2010 | Boudalier |
| 2010/0223276 A1 | 9/2010 | Al-Shameri et al. |
| 2010/0262571 A1 * | 10/2010 | Schmidtler .......... G06N 99/005 706/12 |

(Continued)

OTHER PUBLICATIONS

Gao, Liu, Feng, Qin, Cheng, Ma, "Hierarchical Taxonomy Preparation for Text Categorization Using Consistent Bipartite Spectral Graph Copartitioning", IEEE Transactions on Knowledge and Data Engineering, vol. 17, No. 9, Sep. 2005, pp. 1263-1273.*

(Continued)

*Primary Examiner* — Kakali Chaki
*Assistant Examiner* — Walter Hanchak
(74) *Attorney, Agent, or Firm* — Fish & Richardson P.C.

(57) ABSTRACT

A method and system for classifying documents is provided. A set of document classifiers is generated by applying a classification algorithm to a trusted corpus that includes a set of training documents representing a taxonomy. One or more of the generated document classifiers are executed against a plurality of input documents to create a plurality of classified documents. Each classified document is associated with a classification within the taxonomy and a classification confidence level. One or more classified documents that are associated with a classification confidence level below a predetermined threshold value are selected to create a set of low-confidence documents. The low-confidence documents are disassociated from each of the associated classifications. A user is prompted to enter a classification within the taxonomy for at least one low-confidence document. The low-confidence document is associated with the entered classification and with a predetermined confidence level to create a newly classified document.

20 Claims, 4 Drawing Sheets

(56) References Cited

U.S. PATENT DOCUMENTS

| | | |
|---|---|---|
| 2011/0145178 A1 | 6/2011 | Schmidtler et al. |
| 2012/0078969 A1 | 3/2012 | Ananthanarayanan et al. |
| 2013/0117267 A1 | 5/2013 | Buryak et al. |

OTHER PUBLICATIONS

Wang, Casasent, "A Support Vector Hierarchical Method for Multiclass Classification and Rejection", Proceedings of International Joint Conference on Neural Networks, Atlanta, Georgia, USA, Jun. 2009, pp. 3281-3288.*

Chitan O. Patel, Jame J. Cimino, "Using Semantic and Structural Properties of the Unified Medical Language System to Discover Potential Terminological Relationships", J Am Med Inform Assoc., vol. 16, 2009, pp. 346-353.*

Gokhan Tur, Dilek Hakkani-Tur, Robert E. Schapire, "Combining active and semi-supervised learning for spoken language understanding", Speech Communication, vol. 45, 2005, pp. 171-186.*

Susan Dumais and Hao Chen, "Hierarchical classification of Web content", SIGIR '00 Proceedings of the 23rd annual international ACM SIGIR conference on Research and development in information retrieval, 2000, pp. 256-263.*

Zhaojun Yang, Baichuan Li, Yi Zhu, Irwin King, Gina Levow, Helen Meng, "Collaborative filtering model for user satisfaction prediction in Spoken Dialog System evaluation", Spoken Language Technology Workshop (SLT), 2010 IEEE, Dec. 12-15, 2010, pp. 472-477.*

\* cited by examiner

METHODS AND SYSTEMS FOR CLASSIFYING DATA USING A HIERARCHICAL TAXONOMY

CROSS REFERENCE TO RELATED APPLICATIONS

This application claims priority to provisional patent application Ser. No. 61/580,503 filed on Dec. 27, 2011, which is hereby incorporated by reference in its entirety.

BACKGROUND OF THE INVENTION

This invention relates generally to labeling data and, more particularly, to methods and systems for classifying data using data classification techniques that are based on a hierarchical taxonomy of clustered data.

Automated classification, or "labeling," of data may be used to efficiently organize, route, and/or process such data. As an example, support centers receive large amounts of documents related to support requests. Document labeling techniques, such as clustering, may be used to group together similar documents. For example, when a support center receives a set of documents, the support center may execute clustering software that extracts keywords from the documents. Based on the extracted keywords, the clustering software groups together documents that are associated with similar keywords to generate clusters of documents.

To label the various clusters, a support center may employ individuals to manually review clusters of documents and to determine an appropriate label for the clusters. Rather than reviewing all the documents in a cluster, an individual may review (e.g., read) a sample of documents. Based on the reviewed sample of documents, the individual may label the cluster.

Such techniques may provide a static labeling scheme in which a new incoming document is labeled based on the label previously assigned to a cluster of documents similar to the incoming document. However, topics represented by incoming documents may change over time, such that the creation of new labels is appropriate. In addition, the meaning of terms may change over time, such that a term previously associated with one topic may come to be associated with a new topic. A static labeling scheme may not adequately accommodate such changes.

Similar techniques may also be applied to documents other than support requests. For example, some organizations may use these techniques to organize a variety of documents (e.g., text files, emails, images, metadata files, audio files, presentations, etc.) accessible over the Internet. A static labeling scheme has similar limitations when applied to these types of documents.

BRIEF DESCRIPTION OF THE INVENTION

In one embodiment, a computer-based method including executing instructions stored on a computer-readable medium is provided. The method includes generating a set of document classifiers by applying a classification algorithm to a trusted corpus that includes a set of training documents representing a taxonomy. One or more of the generated document classifiers are executed against a plurality of input documents to create a plurality of classified documents. Each classified document is associated with a classification within the taxonomy and a classification confidence level. One or more classified documents that are associated with a classification confidence level below a predetermined threshold value are selected to create a set of low-confidence documents. The low-confidence documents are disassociated from each of the associated classifications. A user is prompted to enter a classification within the taxonomy for at least one low-confidence document. The low-confidence document is associated with the entered classification and with a predetermined confidence level to create a newly classified document.

In another embodiment, a computer system is provided. The computer system includes a memory for storing a trusted corpus that includes a set of training documents representing a taxonomy. The computer system also includes a processor that is coupled to the memory and programmed to generate a set of document classifiers by applying a classification algorithm to the trusted corpus. The processor is also programmed to execute one or more of the generated document classifiers against a plurality of input documents to create a plurality of classified documents. Each classified document is associated with a classification within the taxonomy and a classification confidence level. The processor is further programmed to select one or more classified documents that are associated with a classification confidence level below a predetermined threshold value to create a set of low-confidence documents, to disassociate the low-confidence documents from each of the associated classifications, and to prompt a user to enter a classification within the taxonomy for at least one low-confidence document. The low-confidence document is associated with the entered classification and with a predetermined confidence level to create a newly classified document.

In another embodiment, one or more computer-readable media having computer-executable instructions embodied thereon is provided. When executed by a computing device, the computer-executable instructions cause the computing device to generate a set of document classifiers by applying a classification algorithm to a trusted corpus that includes a set of training documents representing a taxonomy, to execute one or more of the generated document classifiers against a plurality of input documents to create a plurality of classified documents, wherein each classified document is associated with a classification within the taxonomy and a classification confidence level, to select one or more classified documents that are associated with a classification confidence level below a predetermined threshold value to create a set of low-confidence documents, to disassociate the low-confidence documents from each of the associated classifications, and to prompt a user to enter a classification within the taxonomy for at least one low-confidence document, wherein the low-confidence document is associated with the entered classification and with a predetermined confidence level to create a newly classified document.

BRIEF DESCRIPTION OF THE DRAWINGS

FIG. 1 is a simplified block diagram of an exemplary service system including a plurality of computing devices in accordance with one embodiment of the present invention.

FIG. 2 is a block diagram of exemplary components in a data classification system used for classifying clusters of documents that may be used in conjunction with the system shown in FIG. 1.

FIG. 3 is a flowchart of an exemplary method for classifying documents that may be performed by the system shown in FIG. 2.

FIG. 4 is a block diagram showing example or representative computing devices and associated elements that may be used to implement the systems of FIGS. 1 and 2.

DETAILED DESCRIPTION OF THE INVENTION

Figure 1:
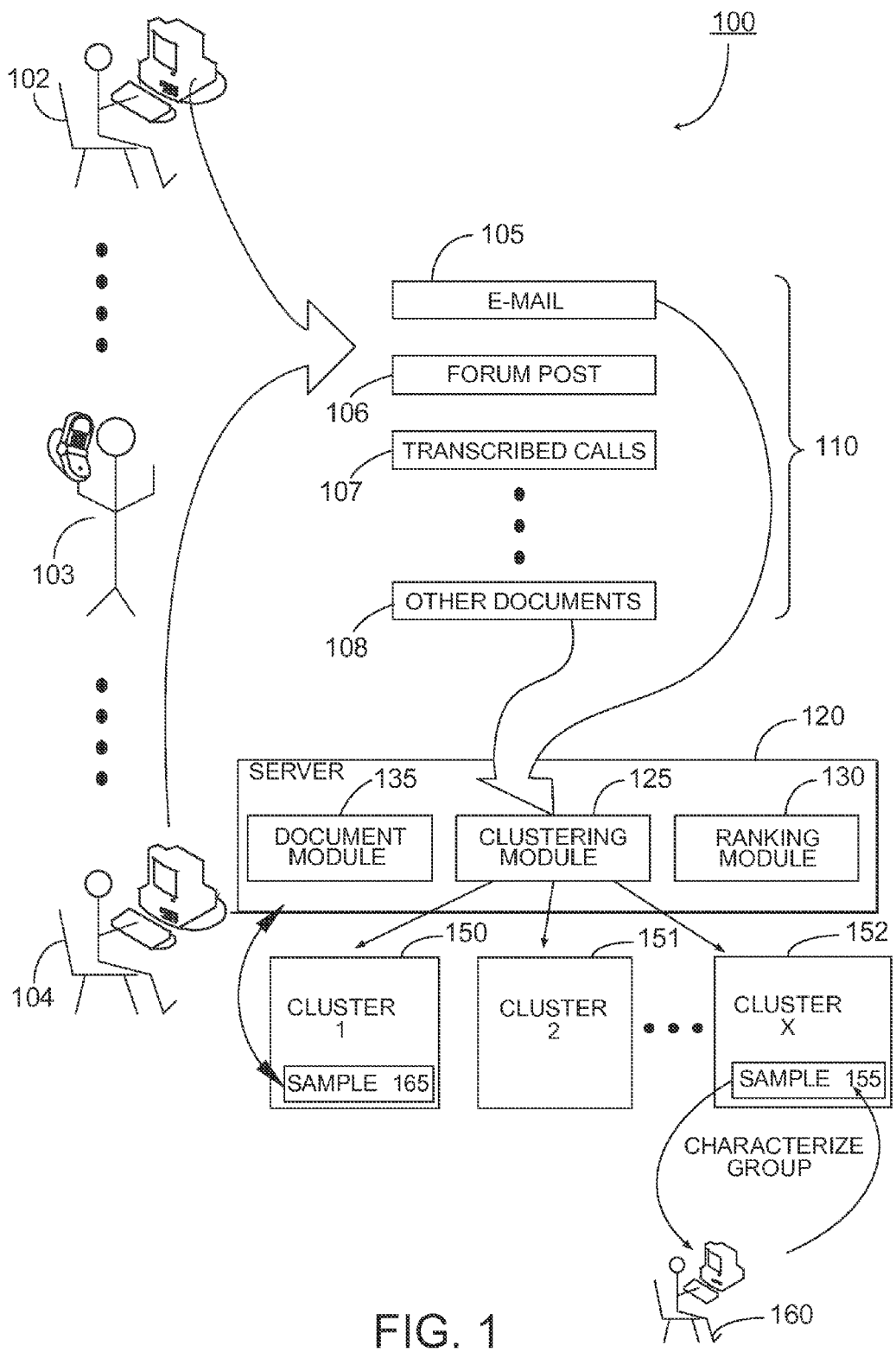
FIGS. 1-4 show exemplary embodiments of the methods and systems described herein.

Domain-specific taxonomy and related documents may be valuable resources for efforts such as customer support, providing standard domain knowledge classification and a hierarchical knowledge base. Described herein is a process of using such a taxonomy and the associated knowledge base to automate data classification, improve label quality and minimize manual review work. Such data may be the content of a plurality of documents. Accordingly, the terms "data classification" and "document classification" are used interchangeably herein. Specific examples related to classifying customer issues in the context of a support center are discussed below, but the methods described are applicable to the classification of any such documents.

A hierarchical taxonomy (e.g., a customer support taxonomy) is a hierarchical tree structure of domain specific issues, which starts with broad, generic topics (e.g., support issues), and drills down into more and more specific subcategories of each topic. For example, in the context of an online advertising service, there may be several product areas that generate customer inquiries: account management, billing, campaign management, performance, policy, etc.

For each of those product areas, a product line manager may want to understand the more fine-grained breakdown of issues. For example, in the billing area, the issues may include categories such as payment processing, credits, refunds, etc.

Drilling down even further, customer support representatives (CSRs) may benefit from understanding the sub-issues of each of these billing sub-categories. To continue the advertising service example, in the subcategory of payment processing under the category of billing, the specific sub-issues may include: 1) Customer has questions on activation fee; 2) Customer's account is marked delinquent; 3) Customer has questions on account cancellation; and 4) Customer has questions on forms of payment and/or invoicing. These multiple levels of issue categories, subcategories, and sub issues together compose a product issue taxonomy, a hierarchical structure of nodes, represented by top-level nodes (e.g., issues) along with child nodes (e.g., sub issues and so forth).

In addition to the hierarchical taxonomy of issues, documents may be associated with each specific issue in the taxonomy. For example, in the context of a support center, such documents may include training documents in the form of sample customer support emails, chats, and/or phone records, as well as the help center documentation, standardized or "canned" responses, CSR training materials, etc.

In exemplary embodiments, a classification model may be used to automatically classify documents. The classification model is trained based on the hierarchical customer issue taxonomy. Training may be performed in two stages: initial training and ongoing training.

Initial training based on the taxonomy is used to generate a set of classifiers aligned with the taxonomy of issues. In initial training, taxonomy training documents are treated as an initial trusted corpus or "seeds." For example, the trusted corpus may include previously classified documents associated with a classification confidence level above a predetermined confidence level threshold (e.g., 80%). A classification algorithm, such as Generalized Expectations Criteria, is applied to the trusted corpus to create document classifiers, which are trained to recognize issues within the taxonomy.

As described above, the taxonomy of topics (e.g., issues) is hierarchical. In some scenarios, a set of documents within the trusted corpus may be classified into two or more topics (e.g., sub-issues). In such a scenario, a low-level classifier may be used to differentiate between these topics. In addition, or alternatively, these topics may be combined into a new topic (e.g., an issue) above the level of these topics in the taxonomy.

When a classifier returns two or more topics for a given document, the lowest common parent of the topics may be identified in the hierarchical taxonomy, and the topic represented by the identified parent may be associated with the document.

Some domain-specific taxonomies may intersect, in which case the topics at least partially overlap. Such taxonomies do not conform to a strict hierarchical structure. And some other taxonomies are sufficiently fine-grained, or have a sufficient number of levels, that machine learning (ML) algorithms are not able to easily distinguish between topics in the taxonomy. Accordingly, during the initial training process, parameters of ML algorithms may be manually adjusted, and the taxonomy may be manually refined. Once the initial training is complete, the classifiers match the refined taxonomy.

Ongoing classification training may be used to continuously refine the classification system over time. For example, as more customer support documents are received, a static taxonomy may be insufficient, as the topics represented by the documents shift over time, and customers might come to use different terms to describe the same issue. Accordingly, manual review may be used to augment and improve the automated classification.

In exemplary embodiments, the taxonomy-generated classifier classifies incoming documents into one of the topics in the taxonomy and associates each classified document with a classification confidence level. If the confidence level is lower than a predefined threshold, the document is declassified and passed to a manual review process. A manual reviewer classifies the document (e.g., by tagging with the correct label), and the document is used as "golden" data (a document with a high classification confidence level) in the next iteration of the training process. Accordingly, operation of the classifiers may be gradually adjusted over time based on manual classification of low-confidence documents.

Embodiments of the methods and systems described herein enable a computer system to (i) generate document classifiers based on a trusted corpus of training documents, (ii) classify unclassified documents using the document classifiers, (iii) determine a confidence level for such classifications, (iv) prompt a user to manually classify documents associated with a low-confidence classification, (v) associate a high level of confidence with manually classified documents, and (vi) use documents associated with a high confidence classification to further train the document classifiers.

In the example embodiment, the system includes a classification manager that performs a semi-supervised classification process. The basic steps in the process are as follows: (1) generating a set of document classifiers by applying a classification algorithm to a trusted corpus, wherein the trusted corpus includes a set of training documents representing a taxonomy; (2) executing one or more of the generated document classifiers against a plurality of input documents to create a plurality of classified documents, wherein each classified document is associated with a classification within the taxonomy and a classification confidence level; (3) selecting one or more classified documents that are associated with a classification confidence level below a predetermined threshold value to create a set of low-confidence documents; (4) disassociating the low-confidence documents from each of the associated classifications; and (5) prompting a user to enter a classification within the taxonomy for at least one low-confidence document, wherein the low-confidence document is associated with the entered classification and with a predetermined confidence level to create a newly classified document.

The following detailed description illustrates embodiments of the invention by way of example and not by way of limitation. It is contemplated that the invention has general application to processing electronic documents such as email messages, messages from online forums (e.g., support forums or message boards), other types of messages, web pages, reviews of products and/or services, news articles, editorials, blogs, text files, images, metadata files, audio files, presentations, and other electronic documents by a party in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effects may include at least one of: a) generating a set of document classifiers by applying a classification algorithm to a trusted corpus, wherein the trusted corpus includes a set of training documents representing a taxonomy; b) executing one or more of the generated document classifiers against a plurality of input documents to create a plurality of classified documents, wherein each classified document is associated with a classification within the taxonomy and a classification confidence level; c) selecting one or more classified documents that are associated with a classification confidence level below a predetermined threshold value to create a set of low-confidence documents; d) disassociating the low-confidence documents from each of the associated classifications; and e) prompting a user to enter a classification within the taxonomy for at least one low-confidence document, wherein the low-confidence document is associated with the entered classification and with a predetermined confidence level to create a newly classified document.

FIG. 1 is a diagram of an example environment 100 for grouping documents from a document corpus 110. In the environment 100, users of a product (illustrated as users 102, 103 and 104) provide information, such as complaints, comments relating to the product, etc. that forms at least a portion of the document corpus 110. Although only three users are depicted, any number of users may provide the information. The number of users may even reach into the hundreds, thousands, tens of thousands, or more. The product can be considered as any type of goods or service. For example, the product can be, but is not limited to, an e-mail service, an advertising service, an Internet Protocol (IP) telephone service, a computer operating system, an electronic device such a computer or smartphone, or an automobile. The information can be provided, for example, in customer-related meetings such as customer support sessions.

In some implementations, the user-provided information can include feedback about the product's performance including, but not limited to, general complaints about the product, issues relating to specific features or operation of the product, and positive comments about the product. The feedback may include statements such as "my laptop would not boot," "my wireless keyboard does not seem to work," "I can't access my advertising account," and "color prints from my printer are getting smudged." Even though the environment 100 relates to customer service or support scenario, it should be noted that the present disclosure applies to various other environments in which documents are grouped into clusters. For example, the methods and systems described can be applied/used to cluster patents or technical literature based on different technologies, to cluster a collection of movie reviews based on genres, and/or to cluster documents accessible over the Internet by subject matter. Accordingly, these techniques may be generally applicable to any documents that may be classified, categorized, or otherwise organized into subjects or topics, which may be represented by classifications or "labels."

In some implementations, the documents in the corpus 110 can vary according to the environment or application. For example, in the customer support environment 100 depicted in FIG. 1, the corpus 110 includes documents related to feedback from the users 102-104 through any appropriate mechanisms, including telephones and computers. The information may include documents such as e-mail messages 105, posts to discussion forums 106, transcriptions of telephone calls 107, and any other document 108 that conveys feedback information, including, for example, records of chat sessions. The corpus 110 is provided to a server 120, which can include a clustering module 125 and a ranking module 130. Clustering module 125 may execute a clustering algorithm to group together documents from the corpus 110 that are similar to each other in some sense. In some implementations, the clustering module 125 can be a part of a clustering engine that resides on the server 120.

In some implementations, clustering can include grouping documents based on some information that is common to the documents. For example, the clustering module 125 can identify information, such as words, phrases, or other textual elements that are common to two or more documents of the corpus. In some implementations, the words are not predefined, but rather are identified based simply on their presence in the documents. Such information, that is not predefined but extracted based on parsing the documents, may be referred to as unplanned information. The clustering module 125 can define clusters corresponding to such unplanned information (e.g., words), and associate documents with corresponding clusters. For example, the clustering module 125 may identify one or more words or phrases, such as "inbox" and "capacity" that are common to at least some of the documents. In such cases, since unplanned terms are used to define clusters, the clustering module 125 can define clusters that might not have been predicted and, therefore, might not otherwise have been identified.

In the above example, the clustering module 125 may define a cluster that contains documents (or references to documents) having both the words "inbox" and "capacity" in their text. Another cluster may include documents having both the words "drop" and "call," and so on. In some implementations, one or more rules can specify, e.g., what words may be used for clustering, the frequency of such words, and the like. For example, the clustering module can be configured to group together documents where a given word or synonyms of the given word are present more than five times. In another example, the clustering module 125 can be configured to group together documents where any of a predefined set of words is present at least once.

In some implementations, one or more sets of pre-labeled documents can be added to the document corpus 110 to create an augmented corpus. For clustering purposes, the labels of the pre-labeled documents can be ignored. Once a clustering algorithm is executed on the augmented corpus, the pre-labeled documents can be tracked to determine their distribution in the various resultant clusters. Further, such tracking may be used to facilitate automatic labeling of the resultant clusters. For example, if the augmented corpus includes pre-labeled documents labeled "A", "B" or "C" and a particular resultant cluster includes 80% of the pre-labeled documents labeled "A" but only 30% of the pre-labeled documents labeled "B", a probability that other documents within the cluster are related to subject matter identified by the label "A" can be higher than a probability that such documents are related to subject matter identified by label "B". Therefore, the cluster (or documents within the cluster) could be labeled "A" with a high degree of confidence. In some implementations, one or more metrics could be defined to assist in the determining if and/or how a particular cluster can be labeled, e.g., based on the distribution of pre-labeled documents within the clusters.

In some implementations, the clustering module 125 produces document clusters 150, 151, 152. Although only three clusters are shown, any number (e.g., one or more) of clusters may be produced. In unsupervised clustering, the significance of a given cluster (e.g. what the cluster represents) is generally unknown. Accordingly, each cluster may need to be labeled. Labeling a cluster with a label can include assigning the label to each document within the cluster. The labeling process may be automatic or manual. For example, a sample 155 may be chosen (e.g. pseudo randomly) from the cluster 152 and read by an operator 160 to identify the subject matter of the sample 155. The cluster 152 may be characterized based on the subject matter identified for one sample (e.g., sample 155) or multiple samples. For example, in a cluster where the words "inbox" and "capacity" occur frequently in the documents, one or more samples can be analyzed to identify that the subject matter generally pertains to complaints on e-mail inbox capacity. In such cases, the cluster can be labeled accordingly (e.g., with a label: "problems with email inbox capacity").

In some implementations, a cluster (e.g. cluster 150) can be labeled by automatically analyzing one or more samples (e.g. a sample 165) from the cluster 150. In such cases, the automatic analysis of the sample can be performed on a computing device, such as the server 120 or other type of computing device. In some implementations, the server 120 can include a labeling engine (not shown) that facilitates operations to automatically label document clusters. In some implementations, where the document corpus 110 is augmented by pre-labeled documents, a cluster can be automatically labeled based on determining a distribution of the pre-labeled documents contained in the cluster. For example, a cluster can be automatically labeled based on the number of pre-labeled documents with a given label that end up in the cluster. In some implementations, a cluster can be automatically labeled based on a relative proportion of a given label to the total number of pre-labeled documents. Such a determination, and hence the automatic labeling on the cluster can be facilitated by the labeling engine. The labeling engine can reside or execute on a computing device such as the server 120. In some implementations, the labeling of the clusters can be facilitated using a combination of automatic and manual methods. For example, if an automatic method fails to unambiguously determine a label for a particular cluster, the cluster may be delegated for further processing by an individual such as the operator 160.

In some implementations, the server 120 can also include a document module 135 for processing the corpus 110. For example, in a customer support environment, the document module 135 may retrieve different types of communications from various users, locations, and format and process the communications such that they share a common document (e.g., textual) format. The communications may be retrieved from a voicemail server (e.g., transcribed telephone calls), from a forum server (e.g., forum posts), from an e-mail server (e.g., e-mails), or from other sources (e.g., servers or other devices) not described here. Retrieval may include requesting and receiving communications relating to a product or service from the various sources and/or performing a direct memory access of storage locations in the various sources for the communications. In some implementations, each source can maintain one or more databases or the like, that stores the various communications, and each source can perform keyword searches of their databases, e.g., to identify communications relating to particular products, services or other items. In some implementations, a communication can be parsed to identify the communication.

The document module 135 may format the documents that it receives so that the resulting documents have a common format. For example, tags or other identifiers, if present, may be removed from the retrieved documents or otherwise modified. Other types of formatting may also be performed, e.g., to remove or modify any formatting codes, headers or other such information.

In some implementations, the document clusters may be ranked using the ranking module 130, which may also be executed on the server 120. In some implementations, the ranking module 130 ranks document clusters according to one or more metrics. For example, the ranking module 130 may rank the clusters 150, 151 and 152 according to the quantity of documents in each cluster, as a cluster with many documents may represent a relatively significant topic (e.g., product issue). As another example, the ranking module 130 may rank the clusters 150, 151 and 152 according to an estimated time to resolution of an issue represented by the cluster (e.g., issues represented by a cluster "software update" may typically be resolved faster than issues represented by a cluster "hardware malfunction"), a label assigned to the cluster, a number of documents in a cluster, a designated importance of subject matter associated with a cluster, identities of authors of documents in a cluster, or a number of people who viewed documents in a cluster, etc. In an example, a cluster representing an issue that historically has taken a longer time to resolve may be ranked higher than a cluster representing an issue with a shorter historical time to resolution. In another example, several metrics are weighted and factored to rank the clusters. The ranking module 130 can be configured to output the rankings to a storage device (e.g., in the form of a list or other construct).

The information obtained by grouping documents into clusters and labeling the clusters may be used to identify problem(s) or other issues with a product or service and to provide appropriate resolution paths. For instance, in response to identifying a cluster (with a label) as "problems with e-mail inbox capacity," a person or department responsible for maintenance of e-mail systems can be contacted to resolve the problem. The resolution could involve instructing the person or department to increase the capacity of e-mail inboxes, or to provide users with an option to increase the inbox capacity (e.g., for an additional fee). The rankings provided by the ranking module 130 may indicate level(s) of importance to the document clusters. The topic(s) (e.g., problems or other issues), identified by the labels assigned to the document clusters, may be addressed in order of importance. For example, if the cluster having "problems with e-mail inbox capacity" is ranked highest among the clusters (and, thus, most important), issues with email capacity may be addressed first, followed by other topics in order of importance.

Figure 2:
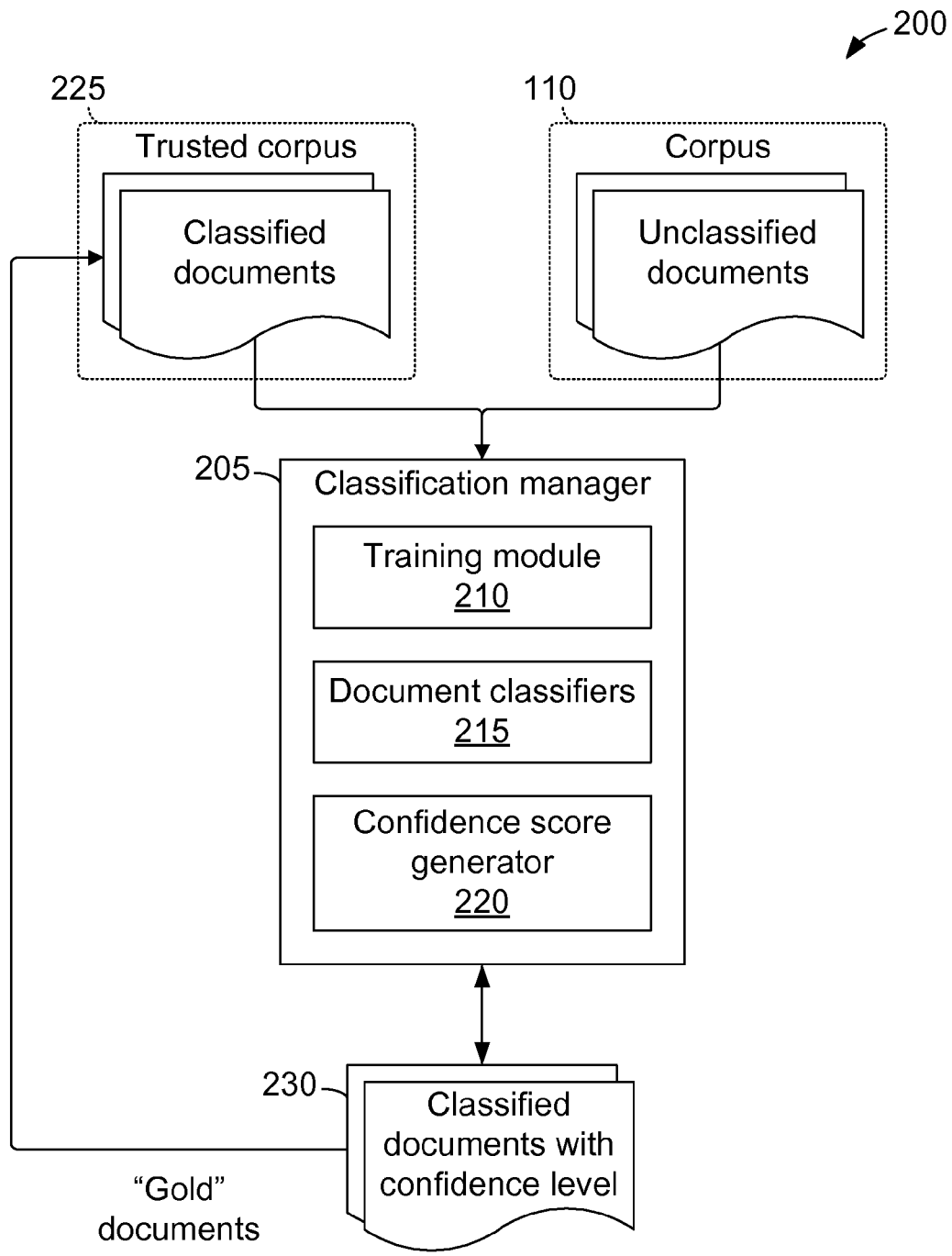

FIG. 2 is a block diagram of exemplary components in a data classification system 200. In exemplary embodiments, data classification system 200 is configured to classify clusters of documents, such as clusters 150, 151, 152 created by system 100 (shown in FIG. 1). System 200 includes a classification manager 205 with a training module 210, document classifiers 215, and a confidence score generator 220. In an example, training module 210 is configured to implement supervised learning techniques to train document classifiers 215 to automatically classify, or "label," clusters of documents in corpus 110 with an underlying customer support issue. (As used herein, the terms "classify" and "label" are used interchangeably.) The learning techniques may be supervised in that they may use training data derived from a manual review of an underlying issue (e.g., classification or label) associated with clusters.

In this example, training module 210 receives training data 225 in the form of a trusted corpus including classified documents. Training module generates and/or trains document classifiers 215 to recognize in unclassified documents the classifications that are included in training data 225. In an example, training module 210 receives a plurality of classified documents in training data 225. The classified documents may each include a set of data (e.g., words, images, symbols, and so forth) and a classification corresponding to the set of data. Document classifiers 215 are trained on the classified documents in training data 225. Specifically, training module 210 applies a learning model to the classified documents. In some embodiments, the learning module applied by training module 210 is supervised. Generally, a supervised learning model includes a process that analyzes training data 225 to identify "attributes" of the classifications included in training data 225. Generally, attributes of a classification include data identifying the classification, including, e.g., data patterns, placement of words, keywords, and so forth.

In an example, exemplary supervised learning models include a support vector machine model, an expectation maximization model, a generative model as described in U.S. Pat. No. 7,231,393 (the entire contents of which are incorporated herein by reference), a probabilistic model as described in U.S. Pat. No. 7,383,258 (the entire contents of which are incorporated herein by reference), a statistical model of user behavior associated with ad selections as described in U.S. Patent Pub. No. 2007/0156887 (the entire contents of which are incorporated herein by reference), an expectation regularization model (see Gideon S. Mann & Andrew McCallum, Simple, Robust, *Scalable Semi-supervised Learning via Expectation Regularization*, Proceedings of the 24th International Conference on Machine Learning, 2007), and so forth.

Based on execution of the learning model, training module 210 learns attributes of a classification and trains document classifiers 215 to determine that documents of a certain type should be associated with a certain classification. In an example, a particular document classifier is trained to recognize when to apply a particular classification.

Still referring to FIG. 2, training module 210 receives data associated with the classified documents in training data 225. In an example, training data 225 includes Document 1, which is associated with the classification "label A"; Document 2, which is associated with the classification "label B"; and Document 3, which is associated with the classification "label C". Based on an execution of a learning model, training module 210 learns a set of attributes associated with label A, a set of attributes associated with label B, and a set of attributes associated with label C.

In this example, document classifiers 215 include document classifier A, document classifier B, and document classifier C. Training module 210 associates document classifier A with label A and the attributes of label A. In particular, document classifier A is trained to recognize appropriate documents to associate with label A, namely documents including data that matches the attributes associated with label A. Training module 210 similarly associates document classifiers B and C with labels B and C, and the attributes of labels B and C, respectively.

In an example, training data 225 may also include data specifying a distribution of classifications across the classified documents included therein. In this example, Document 1 is associated with label A. Document 2 is associated with label B. Document 3 is associated with label B, rather than label C as described in a foregoing example. For these classified documents, a distribution of classifications includes the following distribution: {(Label A, 1), (Label B, 2)}. The foregoing distribution specifies that training data 225 includes one occurrence of label A and two occurrences of label B.

In this example, training module 210 is configured to train document classifiers 215 to detect labels A and B in the unclassified documents included in (untrusted) corpus 110 in accordance with the distribution of classifications included in training data 225. In particular, document classifiers 215 are trained to assign label B to approximately twice as many documents as label A is assigned to documents.

In an example, classification manager 205 may be configured to assign a classification to an unclassified document based on numerous criteria, including, e.g., whether the data included in the unclassified document matches the attributes of a classification, whether the assignment of a particular classification to an unclassified document promotes a distribution of classifications that is in accordance with the distribution of classifications included in training data 225, or any combination thereof. Classification manager 205 may also be configured to assign weights to the numerous criteria used in classifying an unclassified document. In an example, classification manager 205 may be configured to weight more heavily a match between data included in a document and the attributes of a classification, than an assignment of classifications that promotes the distribution of classifications included in training data 225, or vice versa.

In an example, confidence score generator 220 is configured to generate "soft classifications." Generally, soft classifications include a classification that is associated with a confidence score (and/or a probability) indicative of the accuracy of an assignment of a classification to an unclassified document. Confidence score generator 220 generates a confidence score based on a measure of the degree to which data included in an unclassified document matches the attributes of a particular classification.

For example, a confidence score may be based on whether data included in a document includes the data patterns associated with a classification, the placement of words associated with the classification, the keywords associated with the classification, and so forth. In this example, the larger the amount of data in an unclassified document matches the attributes of a classification, the higher the confidence score is for the accuracy of the association of the classification with the unclassified document, and vice versa.

In an example, confidence score generator 220 compares data included in a document to the attributes of a particular classification. Based on the comparison, confidence score generator 220 calculates a confidence score indicative of a correspondence between the data included in the document and the attributes of a particular classification.

In an example, classification manager 205 is configured to determine a classification for a cluster of documents based on the classifications associated with individual, classified documents in the cluster. In particular, classification manager 205 may determine a classification for a cluster by identifying a prevalent classification (e.g., a classification that is associated with a large number of individual, classified documents). Classification manager 205 associates the cluster with the prevalent classification. In another example, classification manager 205 analyzes the confidence scores associated the assignment of classifications to individual documents. In this example, classification manager 205 assigns the cluster a classification associated with an acceptable confidence score, as described in further detail below.

In another example, only a portion of documents in a cluster may be classified and used to determine a classification for a cluster. In this example, seventy percent of the documents in a particular cluster are classified and the remaining thirty percent of documents in the cluster are unclassified. Classification manager 205 determines a classification for the particular cluster based on classifications associated with the seventy percent of documents that are classified.

As previously described, classification manager 205 uses labels A, B, and C to generate document classifiers A, B, and C. In this example, classification manager 205 applies document classifiers A, B, and C to portions of data associated with corpus 110, including, e.g., unclassified documents. Based on an application of document classifiers 215 (e.g., document classifiers A, B, and C), classification manager 205 generates classified documents 230 by associating an unclassified Document 11 with label A, associating an unclassified Document 12 with label B, and associating an unclassified Document 13 with label B.

In an example, a cluster includes Document 11, Document 12, and Document 13, discussed above, as indicated in Table 1 below.

TABLE 1

| Document | Classification | Confidence level |
|---|---|---|
| Document 11 | Label A | 95% |
| Document 12 | Label B | 50% |
| Document 13 | Label B | 60% |

As illustrated in the above Table 1, each of classified Documents 11, 12, and 13 is associated with a confidence score. Specifically, Document 11 is associated with a confidence score of 95%, indicating that confidence score generator 220 determined that the association of label A with Document 11 is 95% accurate. Document 12 is associated with a confidence score of 50%, indicating that confidence score generator 220 determined that the association of label B with Document 12 is 50% accurate. Document 13 is associated with a confidence score of 60%, indicating that confidence score generator 220 determined that the association of label B with Document 13 is 60% accurate.

Classified documents may be associated with a cluster of documents, such as an unclassified cluster. Classification manager 205 analyzes the confidence scores associated with the classified documents to determine which classification to associate with the unclassified cluster. In an example, classification manager 205 does so by calculating a weighted value for each classification based at least in part of the confidence score associated with the classification.

Classification manager 205 then compares the weighed values and selects a classification associated with a weighed value that exceeds a pre-defined threshold. By associating a classification with an unclassified cluster, classification manager 205 generates classified cluster.

In an example, classification manager 205 associates an unclassified Cluster A with a prevalent classification, including, e.g., a classification assigned to classified Documents 11, 12, and 13 a frequent number of times. In this example, classification manager 205 selects label B and generates a classified Cluster A' by associating unclassified Cluster A with label B. In an example, a prevalent classification includes a classification that occurs in a cluster a certain percentage of times, including, e.g., 60%, 70%, 90%, and so forth.

In another example, classification manager 205 associates unclassified Cluster A with a classification associated with an acceptable confidence score. In this example, an acceptable confidence score includes a confidence score associated with a relatively high value. Label A is associated with a confidence score of 95%, which is a relatively high value in comparison to the other confidence scores. In this example, classification manager 205 selects label A and generates classified Cluster A' by associating unclassified Cluster A with label A. In an example, an acceptable confidence score includes a confidence score that exceeds a pre-defined value, including, e.g., a value of 50%, a value of 60%, and so forth.

In an example, confidence score generator 220 is configured to adjust a "confidence threshold" for individual classifications. In particular, a confidence threshold may be different for various classifications. Generally, a confidence threshold specifies a minimum level of accuracy to be achieved by a confidence score. By adjusting the confidence threshold for individual classifications, confidence score generator 220 promotes a corresponding confidence threshold in a classification associated with a cluster.

In this example, confidence score generator 220 may be configured to assign classifications to documents when a confidence score associated with the classification (for a particular document) is greater than a pre-defined confidence threshold, including, e.g., a 90% confidence threshold. In this example, the classifications associated with documents have a confidence score of 90% or higher. Accordingly, a classification selected by configuration manager 205 for a cluster has at least a 90% probability of being an accurate classification for the cluster.

Classification manager 205 may be configured to assign a classification to a cluster of documents using numerous other models. In an example, classification manager 205 is configured to assign a classification to a cluster of documents, for example, based on a subject of a "centroid document." Generally, a centroid document includes a summary of data associated with the documents in a cluster. In this example, classification manager 205 selects the subject of the centroid document as the classification of the cluster.

In another example, classification manager 205 is configured to assign a classification to a cluster based on a ranking of words that are included in the individual documents in an unclassified cluster. A term frequency-inverse document frequency ("tf-idf") model is used in ranking the words that are included in individual documents in an unclassified cluster. Generally, tf-idf includes assigning a weighted value to a word included in a document. The weighted value includes a statistical measure that is used by configuration manager 205 to evaluate an importance of a word to a document in the cluster. The importance of the word increases proportionally to the number of times the word appears in the document. The importance of the word also decreases based on a frequency of an occurrence of the word in the documents in the cluster. In this example, a cluster is classified with a word that is associated with a large weighted value.

Figure 3:
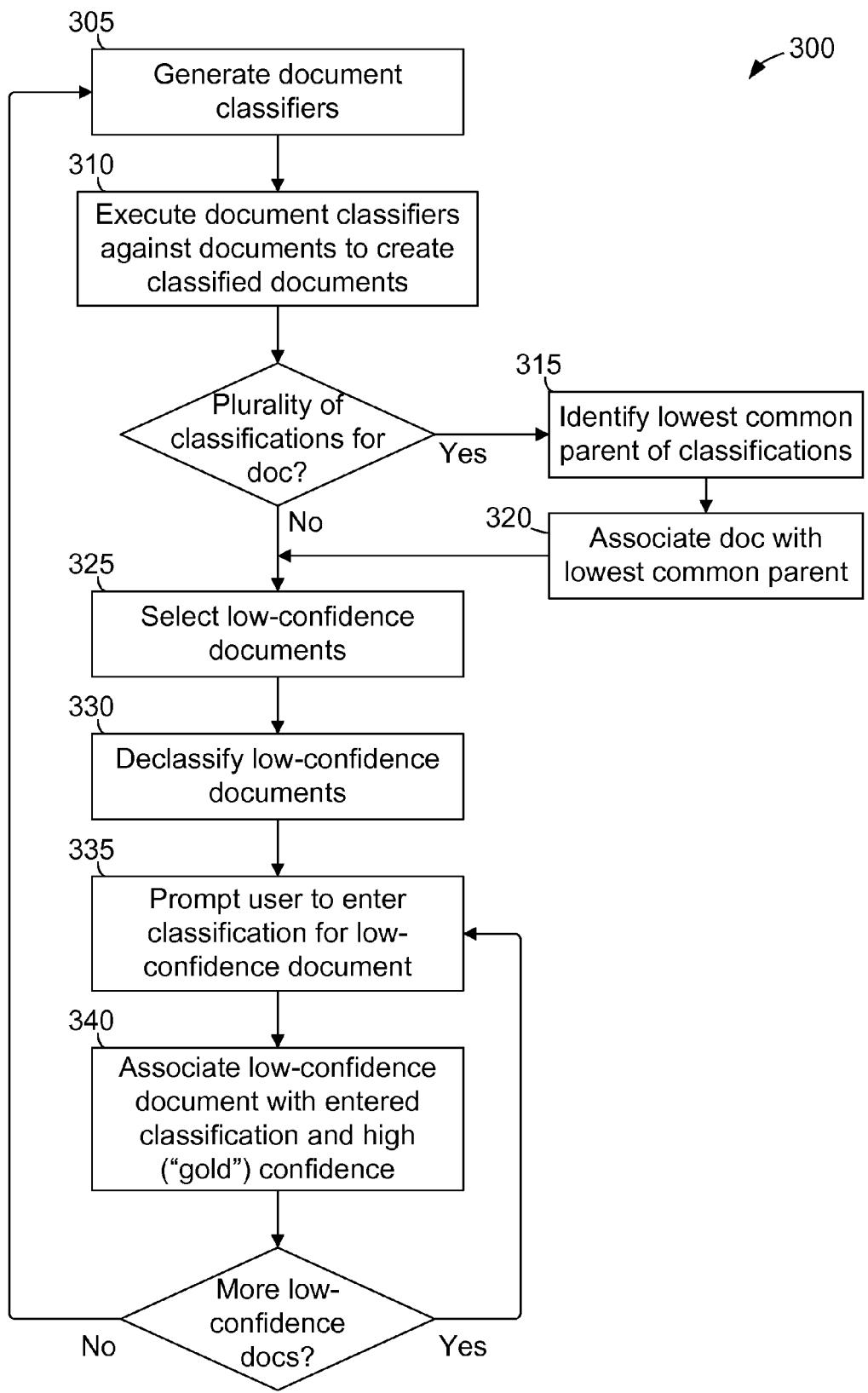

FIG. 3 is a flowchart of an exemplary method 300 executed by system 200 (shown in FIG. 2) for classifying documents. Referring to FIGS. 2 and 3, in exemplary embodiments, method 300 is performed by classification manager 205, which is executed by a computing device.

Classification manager 205 (e.g., using training module 210) generates 305 a set of document classifiers 215 by applying a classification algorithm to trusted corpus, which includes a set of training documents 225 representing a taxonomy. For example, training documents 225 may be classified into a taxonomy that includes a hierarchy of classifications. In exemplary embodiments, the trusted corpus includes email messages, chat logs, transcribed telephone conversations, customer support documentation, predetermined responses to support issues, and/or customer service representative training documents.

Further, training documents 225 included in the trusted corpus may include only classified documents that are associated with a classification confidence level greater than a predetermined threshold value (e.g., 80%, 90%, 95%, or 100%). As an example, training documents 225 may include classified documents that are associated with a classification manually entered by a user (e.g., in response to prompting 335, as described in more detail below).

Classification manager 205 executes 310 one or more of the generated document classifiers against a plurality of input documents (e.g., unclassified documents) in corpus 110 to create a plurality of classified documents 230. Each classified document 230 is associated with a classification within the taxonomy and a classification confidence level (e.g., determined by confidence score generator 220).

In some scenarios, document classifiers 215 may return a plurality of classifications for an input document in corpus 110. Referring to such an input document as a first input document, classification manager 205 identifies 315 a lowest common parent node of the plurality of classifications within the taxonomy. More specifically, the taxonomy may include a plurality of levels, and each level may include one or more nodes representing a classification or "label." For example, if the classifications "capacity" and "spam" are in a third level of the taxonomy and related as children to the classification "email" in a second level of the taxonomy, classification manager 205 may identify 315 "email" as the lowest common parent of the classifications returned by document classifiers 215. In other examples, the lowest common parent may be two or more levels above the returned classifications in the taxonomy. Classification manager 205 associates 320 the first input document with the identified lowest common parent.

Classification manager 205 (e.g., using training module 210) selects 325 one or more classified documents 230 that are associated with a classification confidence level below a predetermined threshold value (e.g., 50%, 60%, or 75%) to create a set of low-confidence documents. Classification manager 205 declassifies 330 the low-confidence documents by disassociating the low-confidence documents from each of the associated classifications.

Classification manager 205 prompts 335 a user to enter a classification within the taxonomy for at least one low-confidence document. When the user enters a classification, classification manager 205 associates 340 the low-confidence document with the entered classification and with a predetermined confidence level to create a newly classified document in classified document 230. In exemplary embodiments, the predetermined confidence level is a highest possible confidence level (e.g., 100%) and may be referred to as a "gold" confidence. Similarly, classified documents 230 associated with a gold confidence level may be referred to as gold documents. As shown in FIG. 2, gold documents may be included in training documents 225, such that user-entered classifications are taken into account in future iterations of method 300. For example, document classifiers 215 may be generated based at least in part on the gold documents associated with user-entered classifications. One or more users may be similarly prompted 335 to enter a classification for all low-confidence documents in classified documents 230.

Figure 4:
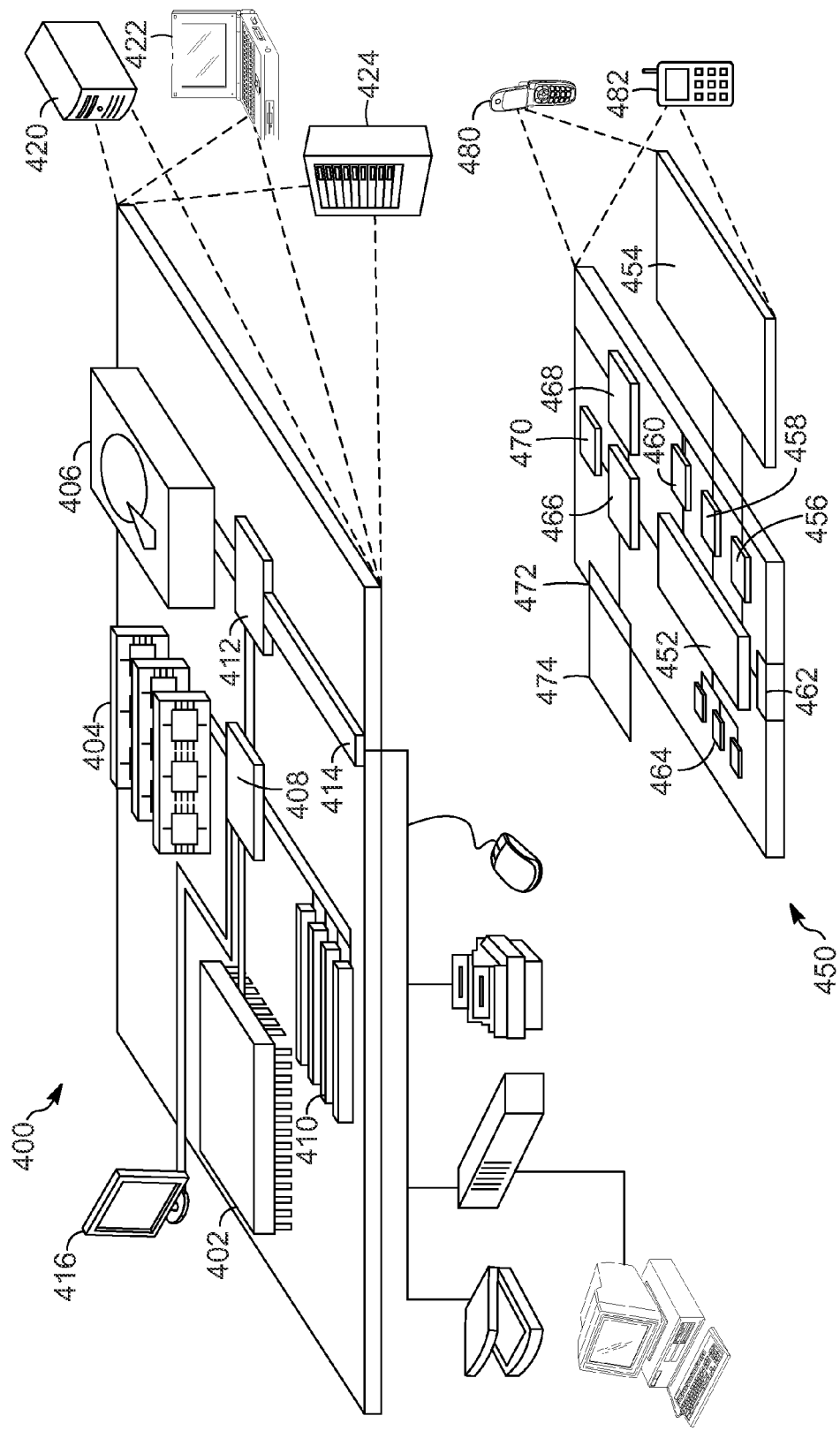

FIG. 4 is a block diagram showing example or representative computing devices and associated elements that may be used to implement the systems of FIGS. 1 and 2. FIG. 4 shows an example of a generic computing device 400 and a generic mobile computing device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface or controller 408 connecting to memory 404 and high-speed expansion ports 410, and a low-speed interface or controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed bus, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 456, and 458, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452, that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning system) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smart phone 482, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 400 and/or 450) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing devices 400 and 450 are configured to receive and/or retrieve electronic documents from various other computing devices connected to computing devices 400 and 450 through a communication network, and store these electronic documents within at least one of memory 404, storage device 406, and memory 464. Computing devices 400 and 450 are further configured to manage and organize these electronic documents within at least one of memory 404, storage device 406, and memory 464 using the techniques described herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer-readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A computer-implemented method including executing instructions stored on a computer-readable medium, the method comprising:

generating a set of document classifiers by applying a classification algorithm to a trusted corpus, wherein the trusted corpus includes a set of training documents representing a hierarchical taxonomy, the hierarchical taxonomy including a hierarchical tree structure of domain specific issues that includes multiple levels of issue categories, subcategories, and sub issues of each issue, the trusted corpus further includes previously classified documents associated with a classification confidence level above a predetermined confidence level threshold;

executing one or more of the generated document classifiers against a first plurality of input documents to create a first plurality of classified documents, wherein each classified document is associated with a classification within the taxonomy and a classification confidence level;

selecting one or more classified documents that are associated with a classification confidence level below the predetermined confidence level threshold to create a set of low-confidence documents;

disassociating the low-confidence documents from each of the associated classifications;

prompting a user to enter a new classification within the hierarchical taxonomy for at least one low-confidence document, wherein the low-confidence document is associated with the entered classification and with a predetermined confidence level to create a newly classified document in at least one of the multiple levels of issue categories, subcategories, and sub issues of each issue of the hierarchical taxonomy;

applying a highest classification confidence level to the newly classified document;

including the newly classified document in the trusted corpus to create an updated trusted corpus; and executing one or more of the generated document classifiers, by applying the classification algorithm to the updated trusted corpus against a second plurality of input documents to create a second plurality of classified documents, wherein each classified document is associated with a classification within the taxonomy and a classification confidence level.

2. The method of claim 1, wherein generating a set of document classifiers further comprises applying a classification algorithm to a trusted corpus by applying the classification algorithm to a trusted corpus including classified documents having a classification confidence level greater than a predetermined confidence level threshold.

3. The method of claim 1, wherein generating a set of document classifiers further comprises applying a classification algorithm to a trusted corpus by applying the classification algorithm to a trusted corpus including classified documents associated with a classification entered by a user.

4. The method of claim 1, further comprising selecting one or more of the classified documents from the second plurality of input documents that are associated with a classification confidence below a different predetermined confidence level threshold to create a new set of low-confidence documents, wherein the different predetermined confidence level threshold is lower than the predetermined confidence level threshold.

5. The method of claim 1, further comprising, when one or more of the generated document classifiers returns a plurality of classifications for a first input document of the plurality of input documents:

identifying a lowest common parent node of the plurality of classifications within the taxonomy; and associating the first input document with the identified lowest common parent node.

6. The method of claim 1, wherein generating a set of document classifiers further comprises applying a classification algorithm to a trusted corpus by applying the classification algorithm to a trusted corpus including one or more of the following: email messages, chat logs, and transcribed telephone conversations.

7. The method of claim 1, wherein generating a set of document classifiers further comprises applying a classification algorithm to a trusted corpus by applying the classification algorithm to a trusted corpus including one or more of the following: customer support documentation, predetermined responses to support issues, and customer service representative training documents.

8. A computer system comprising:

a memory for storing a trusted corpus, wherein the trusted corpus includes a set of training documents representing a hierarchical taxonomy, the hierarchical taxonomy including a hierarchical tree structure of domain specific issues that includes multiple levels of issue categories, subcategories, and sub issues of each issue, the trusted corpus further includes previously classified documents associated with a classification confidence level above a predetermined confidence level threshold; and a processor coupled to the memory and programmed to:

generate a set of document classifiers by applying a classification algorithm to the trusted corpus;

execute one or more of the generated document classifiers against a first plurality of input documents to create a first plurality of classified documents, wherein each classified document is associated with a classification within the taxonomy and a classification confidence level;

select one or more classified documents that are associated with a classification confidence level below the predetermined confidence level threshold to create a set of low-confidence documents;

disassociate the low-confidence documents from each of the associated classifications;

prompt a user to enter a classification within the hierarchical taxonomy for at least one low-confidence document, wherein the low-confidence document is associated with the entered classification and with a predetermined confidence level to create a newly classified document;

apply a highest classification confidence level to the newly classified document;

include the newly classified document in the trusted corpus to create an updated trusted corpus; and execute one or more of the generated document classifiers, by applying the classification algorithm to the updated trusted corpus against a second plurality of input documents to create a second plurality of classified documents, wherein each classified document is associated with a classification within the taxonomy and a classification confidence level.

9. The system of claim 8, wherein the processor is programmed to apply the classification algorithm against a trusted corpus including classified documents with a classification confidence level greater than a predetermined confidence level threshold.

10. The system of claim 8, wherein the processor is programmed to apply the classification algorithm to a trusted corpus including classified documents associated with a classification entered by a user.

11. The system of claim 8, wherein the processor is further programmed to select one or more of the classified documents from the second plurality of input documents that are associated with a classification confidence below a different predetermined confidence level threshold to create a new set of low-confidence documents, wherein the different predetermined confidence level threshold is lower than the predetermined confidence level threshold.

12. The system of claim 8, wherein when one or more of the generated document classifiers returns a plurality of classifications for a first input document of the plurality of input documents, the processor is further programmed to:
- identify a lowest common parent of the plurality of classifications within the taxonomy; and
- associate the first input document with the identified lowest common parent.

13. The system of claim 8, wherein the processor is programmed to apply the classification algorithm to a trusted corpus including one or more of the following: email messages, chat logs, and transcribed telephone conversations.

14. The system of claim 8, wherein the processor is programmed to apply the classification algorithm to a trusted corpus including one or more of the following: customer support documentation, predetermined responses to support issues, and customer service representative training documents.

15. One or more non-transitory computer-readable media having computer-executable instructions embodied thereon, wherein when executed by a computing device, the computer-executable instructions cause the computing device to:
- generate a set of document classifiers by applying a classification algorithm to a trusted corpus, wherein the trusted corpus includes a set of training documents representing a hierarchical taxonomy, the hierarchical taxonomy including a hierarchical tree structure of domain specific issues that includes multiple levels of issue categories, subcategories, and sub issues of each issue, the trusted corpus further includes previously classified documents associated with a classification confidence level above a predetermined confidence level threshold;
- execute one or more of the generated document classifiers against a first plurality of input documents to create a first plurality of classified documents, wherein each classified document is associated with a classification within the taxonomy and a classification confidence level;
- select one or more classified documents that are associated with a classification confidence level below the predetermined confidence level threshold to create a set of low-confidence documents;
- disassociate the low-confidence documents from each of the associated classifications;
- prompt a user to enter a classification within the hierarchical taxonomy for at least one low-confidence document, wherein the low-confidence document is associated with the entered classification and with a predetermined confidence level to create a newly classified document;
- apply a highest classification confidence level to the newly classified document;
- include the newly classified document in the trusted corpus to create an updated trusted corpus; and
- execute one or more of the generated document classifiers, by applying the classification algorithm to the updated trusted corpus against a second plurality of input documents to create a second plurality of classified documents, wherein each classified document is associated with a classification within the taxonomy and a classification confidence level.

16. The computer-readable media of claim 15, wherein the computer-executable instructions cause the processor to apply the classification algorithm to a trusted corpus including classified documents with a classification confidence level greater than a predetermined confidence level threshold.

17. The computer-readable media of claim 15, wherein the computer-executable instructions cause the processor to apply the classification algorithm to a trusted corpus including classified documents associated with a classification entered by a user.

18. The computer-readable media of claim 15, wherein the computer-executable instructions further cause the processor to select one or more of the classified documents from the second plurality of input documents that are associated with a classification confidence below a different predetermined confidence level threshold to create a new set of low-confidence documents, wherein the different predetermined confidence level threshold is lower than the predetermined confidence level threshold.

19. The computer-readable media of claim 15, wherein when one or more of the generated document classifiers returns a plurality of classifications for a first input document of the plurality of input documents, the computer-executable instructions cause the processor to apply the classification algorithm to:
- identify a lowest common parent of the plurality of classifications within the taxonomy; and
- associate the first input document with the identified lowest common parent.

20. The computer-readable media of claim 15, wherein the computer-executable instructions cause the processor to apply the classification algorithm to a trusted corpus including one or more of the following: email messages, chat logs, transcribed telephone conversations, customer support documentation, predetermined responses to support issues, and customer service representative training documents.

\* \* \* \* \*